United States Patent
Hinchliffe et al.

(10) Patent No.: US 6,266,031 B1
(45) Date of Patent: Jul. 24, 2001

(54) CATHODE STRUCTURE FOR A PALC PANEL

(75) Inventors: Robert D. Hinchliffe, Newberg; Kevin J. Ilcisin, Beaverton, both of OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/168,877

(22) Filed: Oct. 10, 1998

Related U.S. Application Data
(60) Provisional application No. 60/063,378, filed on Oct. 24, 1997.

(51) Int. Cl.$^7$ .................................................. G09G 3/28
(52) U.S. Cl. ................ 345/60; 345/37; 313/580
(58) Field of Search ................ 345/60, 37, 41; 313/580

(56) References Cited

U.S. PATENT DOCUMENTS

| | | | |
|---|---|---|---|
| 5,804,920 | * 9/1998 | Khan et al. | 345/60 |
| 5,821,912 | * 10/1998 | Miyazaki | 345/60 |
| 5,990,619 | * 11/1999 | Ilcisin et al. | 345/60 |
| 6,002,382 | * 12/1999 | Hayashi et al. | 345/60 |
| 6,028,572 | * 2/2000 | Ilcisin et al. | 345/60 |

\* cited by examiner

*Primary Examiner*—Richard Hjerpe
*Assistant Examiner*—Kimnhung Nguyen
(74) *Attorney, Agent, or Firm*—John D. Winkelman; John Smith-Hill

(57) ABSTRACT

A PALC panel has narrow cathodes.

1 Claim, 2 Drawing Sheets

CATHODE STRUCTURE FOR A PALC PANEL

CROSS REFERENCED TO RELATED APPLICATIONS

This application claims the benefit of U.S. Provisional Application No. 60/063,378, filed Oct. 24, 1997.

BACKGROUND OF THE INVENTION

This invention relates to a cathode structure for a PALC panel.

U.S. Pat. No. 5,077,553 discloses apparatus for addressing data storage elements. A practical implementation of the apparatus shown in U.S. Pat. No. 5,077,553 is illustrated schematically in FIG. 1 of the accompanying drawings.

The display panel shown in FIG. 1 comprises, in sequence from below, a polarizer 2, a channel member 4, a cover sheet 6 (commonly known as a microsheet), a layer 10 of electro-optic material, an array of parallel transparent data drive electrodes (only one of which, designated 12, can be seen in the view shown in FIG. 1), an upper substrate 14 carrying the data drive electrodes, and an upper polarizer 16. In the case of a color display panel, the panel includes color filters (not shown) between the layer 10 and the upper substrate 14. The panel may also include layers for improving viewing angle and for other purposes. The channel member 4 is typically made of glass and is formed with multiple parallel channels 20 in its upper main face. The channels 20, which are separated by ribs 22, are filled with an ionizable gas, such as helium. An anode 24 and a cathode 26 are provided in each of the channels 20. The channels 20 are orthogonal to the data drive electrodes and the region where a data drive electrode crosses a channel (when viewed perpendicularly to the panel) forms a discrete panel element 28. Each panel element can be considered to include elements of the layer 10 and the lower and upper polarizers 2 and 16. The region of the upper surface of the display panel that bounds the panel element constitutes a single pixel 30 of the display panel.

When the anode 24 in one of the channels is connected to ground and a suitable negative voltage is applied to the cathode 26 in that channel, the gas in the channel forms a plasma which provides a conductive path to ground at the lower surface of the cover sheet 6. If a data drive electrode is at ground potential, there is no significant electric field in the volume element of electro-optic material in the panel element at the crossing of the channel and the data drive electrode and the panel element is considered to be off, whereas if the data drive electrode is at a substantially different potential from ground, there is a substantial electric field in that volume element of electro-optic material and the panel element is considered to be on.

It will be assumed in the following description, without intending to limit the scope of the claims, that the lower polarizer 2 is a linear polarizer and that its plane of polarization can be arbitrarily designated as being at 0° relative to a reference plane, that the upper polarizer 16 is a linear polarizer having its plane of polarization at 90°, and that the electro-optic material is a twisted nematic liquid crystal material which rotates the plane of polarization of linearly polarized light passing therethrough by an angle which is a function of the electric field in the liquid crystal material. When the panel element is off, the angle of rotation is 90°; and when the panel element is on, the angle of rotation is zero.

The panel is illuminated from the underside by an extended light source 34 which emits unpolarized white light. A rear glass diffuser 18 having a scattering surface may be positioned between the light source and the panel in order to provide uniform illumination of the panel. The light that enters a given panel element from the source is linearly polarized at 0° by the lower polarizer 2 and passes sequentially through the channel member 4, the channel 20, the cover sheet 6, and the volume element of the liquid crystal material toward the upper polarizer 16 and a viewer 32. If the panel element is off, the plane of polarization of linearly polarized light passing through the volume element of liquid crystal material is rotated through 90°, and therefore the plane of polarization of light incident on the upper polarizer element is at 90°. The light is passed by the upper polarizer element and the pixel is illuminated. If, on the other hand, the panel element is on, the plane of polarization of the linearly polarized light is not changed on passing through the volume element of liquid crystal material. The plane of polarization of light incident on the upper polarizer element is at 0° and therefore the light is blocked by the upper polarizer element and the pixel is dark. If the electric field in the volume element of liquid crystal material is intermediate the values associated with the panel element being off and on, light is passed by the upper polarizer element with an intensity which depends on the electric field, allowing a gray scale to be displayed.

In the conventional PALC display panel, the electrodes are about 75 $\mu$m wide, independently of the width of the channel.

During operation of a PALC display panel, material is sputtered from the cathode and some of this material is deposited on the lower surface of the cover sheet and on the bottom of the channel. This deposited material partially blocks transmission of light by the panel elements and so as the sputtering continues, the transmission of the panel elements becomes progressively smaller. This progressive degradation in the transmission of the panel elements reduces the useful life of the display panel.

The rate at which material is sputtered from the cathode and deposited on the lower surface of the cover sheet and the bottom of the channel depends on the current supplied to the plasma. The current supplied to the plasma also affects the power consumption of the PALC panel.

SUMMARY OF THE INVENTION

It has been recognized in accordance with the invention that the current supplied to the plasma depends on the area of the cathode, so that by reducing the area of the cathode, the current supplied to the plasma is reduced, and the power consumption and the sputtering rate are reduced accordingly.

In accordance with a first aspect of the present invention there is provided an improved PALC panel comprising a channel member having a plurality of channels therein and a cathode and anode in each channel for establishing a plasma in the channel, wherein the improvement resides in that the cathodes are narrow.

In accordance with a second aspect of the present invention there is provided a PALC panel comprising a channel member having a plurality of channels therein and a cathode and anode in each channel for establishing a plasma in the channel, wherein the cathodes are substantially less than 75 $\mu$m in width.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
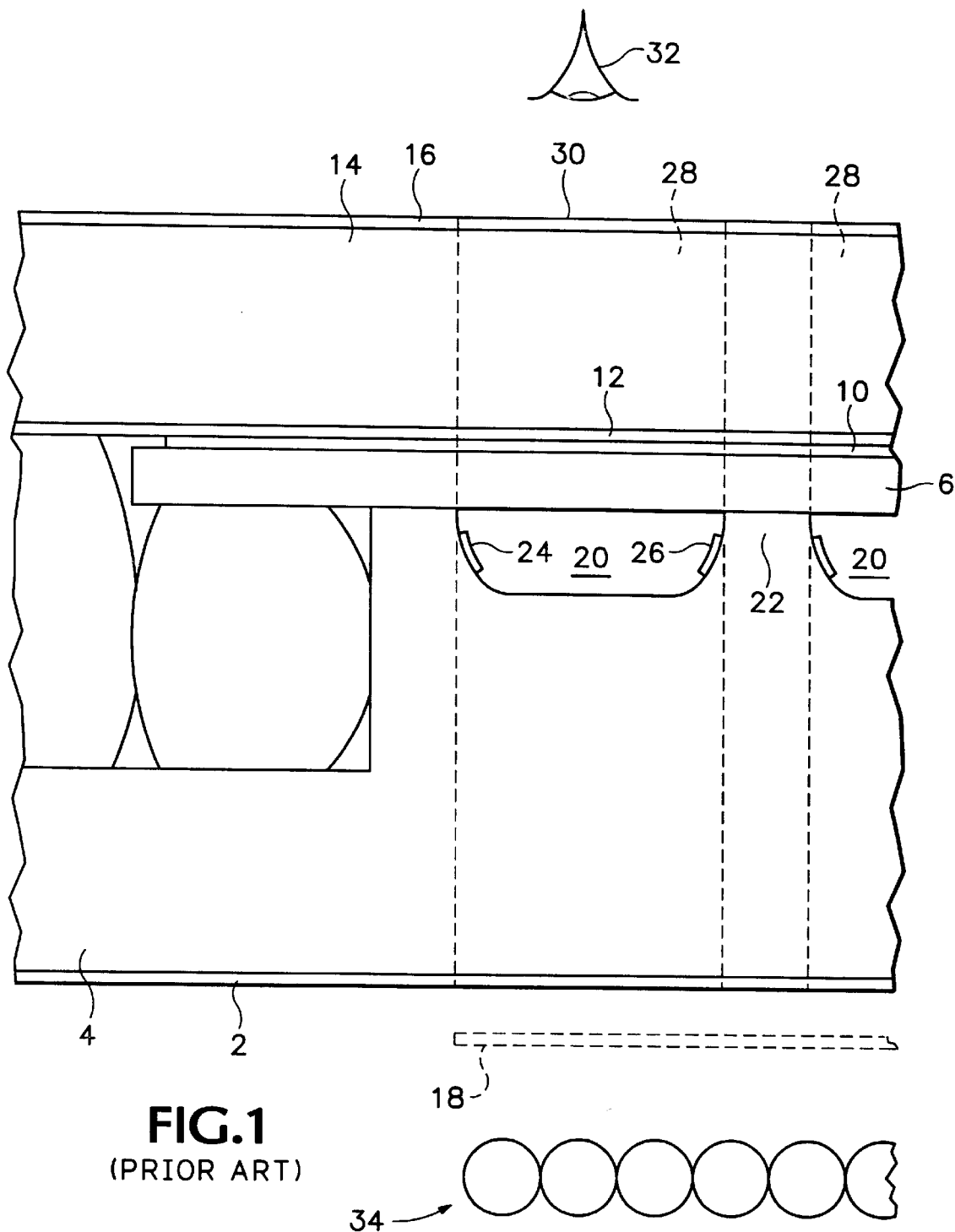
FIG. 1 is a partial sectional view of a PALC display panel in accordance with the prior art.
Figure 2:
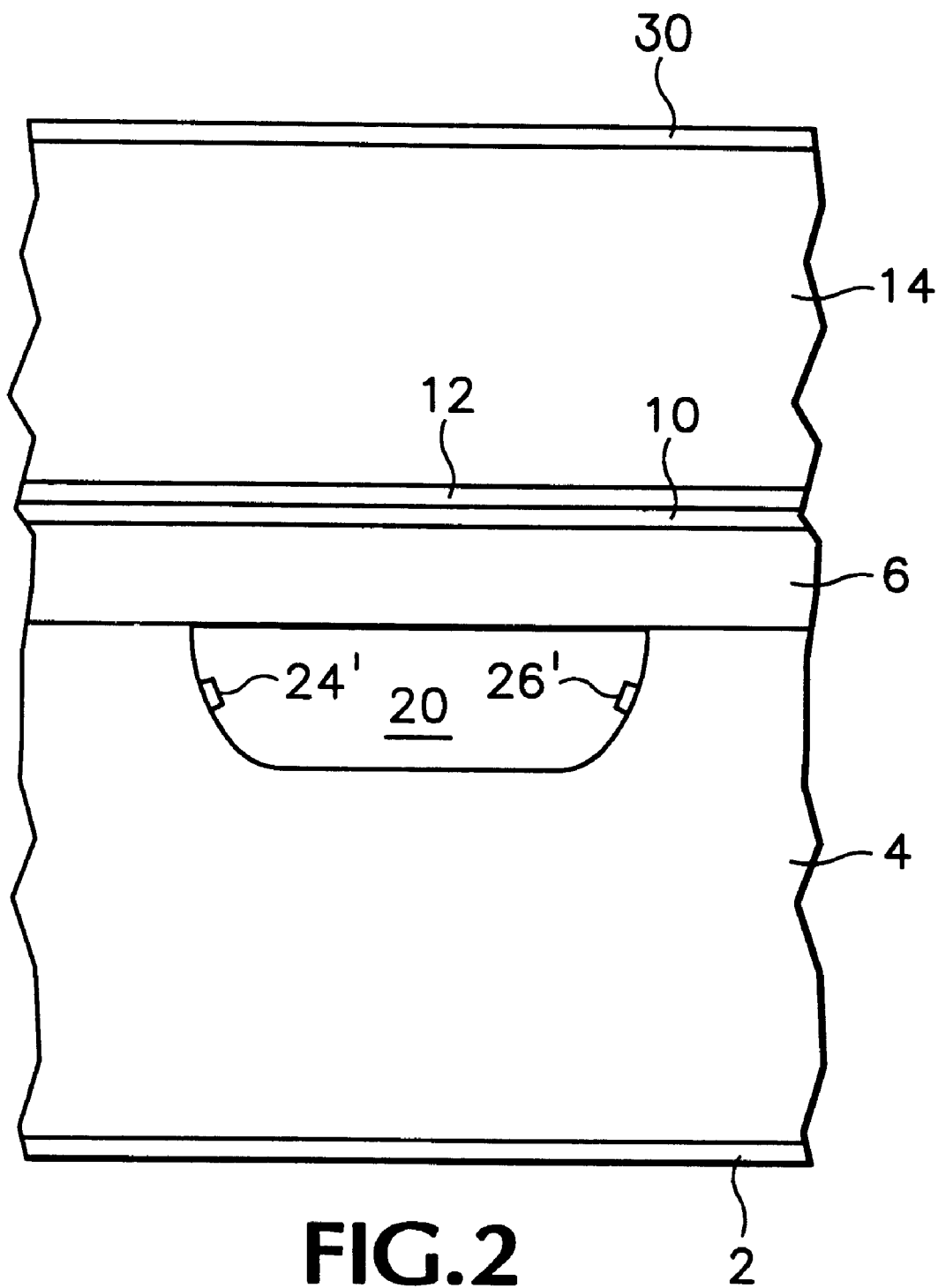
FIG. 2 is a similar view of a PALC display panel in accordance with the present invention.

In the PALC display panel shown in FIG. 2, the cathodes 26' are substantially less than 75 $\mu$m in width. Preferably, the cathodes 26' are no more than about 35 $\mu$m in width. The narrow cathodes reduce the current supplied to the plasma, thus reducing both the power consumption and the sputtering rate as compared with the panel shown in FIG. 1, thereby prolonging the useful life of the display panel.

It is preferred for ease of manufacturing that the anodes 24' be of the same width as the cathodes 26', but neither the performance of the panel nor its useful life is impaired if the anodes are of the same width as the anodes of the conventional display panel.

It will be appreciated that the invention is not restricted to the particular embodiment that has been described, and that variations may be made therein without departing from the scope of the invention as defined in the appended claims and equivalents thereof.

What is claimed is:

1. An improved PALC panel comprising a channel member having a plurality of channels therein and a cathode and anode in each channel for establishing a plasma in the channel, characterized in that the cathodes are not greater than 35 $\mu$m in width.

* * * * *